United States Patent
Devdas et al.

(10) Patent No.: US 10,581,846 B2
(45) Date of Patent: Mar. 3, 2020

(54) USER AUTHENTICATION VIA DEVICE CHARACTERISTICS

(71) Applicant: INTERNATIONAL BUSINESS MACHINES CORPORATION, Armonk, NY (US)

(72) Inventors: Bharat Devdas, Bangalore (IN); Srihari Kulkarni, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 101 days.

(21) Appl. No.: 15/270,020

(22) Filed: Sep. 20, 2016

(65) Prior Publication Data

US 2018/0083963 A1    Mar. 22, 2018

(51) Int. Cl.

| | |
|---|---|
| *G06F 21/45* | (2013.01) |
| *H04L 29/06* | (2006.01) |
| *H04L 29/08* | (2006.01) |
| *H04W 12/06* | (2009.01) |
| *G06F 21/31* | (2013.01) |
| *H04W 8/24* | (2009.01) |
| *H04W 8/18* | (2009.01) |
| *H04W 8/22* | (2009.01) |
| *H04W 12/00* | (2009.01) |

(52) U.S. Cl.
CPC ........ *H04L 63/0876* (2013.01); *H04L 63/102* (2013.01); *H04L 67/306* (2013.01); *H04W 12/06* (2013.01); *H04W 8/18* (2013.01); *H04W 8/22* (2013.01); *H04W 8/24* (2013.01); *H04W 12/00512* (2019.01)

(58) Field of Classification Search
None
See application file for complete search history.

(56) References Cited

U.S. PATENT DOCUMENTS

| | | | |
|---|---|---|---|
| 8,099,490 B2 | 1/2012 | Deakin | |
| 8,554,912 B1* | 10/2013 | Reeves | G06F 21/552 |
| | | | 455/410 |

(Continued)

OTHER PUBLICATIONS

Intrusion Detection in Cellular Mobile Networks. Sun et al. (Year: 2007).*

*Primary Examiner* — Venkat Perungavoor
(74) *Attorney, Agent, or Firm* — Erik K. Johnson

(57) ABSTRACT

An embodiment of the invention may include a method, computer program product and system for authenticating a user device. The embodiment may include receiving a plurality of device parameter from a user device. The embodiment may include selecting a user profile having a plurality of user profile characteristics based on determining a match between at least one device characteristic of the plurality of device characteristics with at least one user profile characteristic of the plurality of user profile characteristics. The embodiment may include determining whether a device parameter from the plurality of device characteristics of the user device matches a user profile parameter of the plurality of user profile characteristics. The embodiment may include increasing a device value based on determining that the device parameter matches the user profile parameter. The embodiment may include authenticating the user device based on determining that the device value is above a threshold value.

10 Claims, 3 Drawing Sheets

(56) References Cited

U.S. PATENT DOCUMENTS

| | | | |
|---|---|---|---|
| 8,606,223 B1* | 12/2013 | Lekutai | H04M 15/8083 379/114.26 |
| 10,015,185 B1* | 7/2018 | Kolman | H04L 63/1425 |
| 2006/0154646 A1 | 7/2006 | Tung | |
| 2006/0221893 A1 | 10/2006 | Kiss | |
| 2010/0107225 A1* | 4/2010 | Spencer | H04L 63/0876 726/4 |
| 2010/0125652 A1* | 5/2010 | Rantapuska | H04L 12/2818 709/222 |
| 2014/0277597 A1* | 9/2014 | Le Sant | H04L 63/1433 700/17 |
| 2015/0026330 A1 | 1/2015 | Ahmed et al. | |
| 2015/0046989 A1* | 2/2015 | Oberheide | G06F 21/44 726/6 |
| 2015/0227729 A1* | 8/2015 | Grigg | G06F 21/31 726/7 |
| 2016/0155128 A1* | 6/2016 | Desai | G06Q 20/4016 705/44 |
| 2017/0230418 A1* | 8/2017 | Amar | H04L 67/22 |
| 2018/0004925 A1* | 1/2018 | Petersen | G10L 17/04 |

* cited by examiner

USER AUTHENTICATION VIA DEVICE CHARACTERISTICS

BACKGROUND

The present invention relates to device authentication, and more specifically, to mapping a device based on characteristics of the device.

Computing devices contain multiple different unique identification numbers for different aspects of the system. For example, a mobile device may contain a UDID from an operating system, an IMEI based on its mobile network connection, a MAC address based on its wifi connection, and a serial number for any component part. Such identifiers may be used to identify components or pieces of a computing device, and may be unique to that computing device.

BRIEF SUMMARY

An embodiment of the invention may include a method, computer program product and system for authenticating a user device. The embodiment may include receiving a plurality of device parameter from a user device. The embodiment may include determining a user profile from a device database having a plurality of user profile characteristics based on determining a match between at least one device characteristic of the plurality of device characteristics with at least one user profile characteristic of the plurality of user profile characteristics. The embodiment may include determining whether a device parameter from the plurality of device characteristics of the user device matches a user profile parameter of the plurality of user profile characteristics. The embodiment may include increasing a device value based on determining that the device parameter matches the user profile parameter. The embodiment may include authenticating the user device based on determining that the device value is above a threshold value.

DETAILED DESCRIPTION

Embodiments of the present invention will now be described in detail with reference to the accompanying Figures.

Authenticating users, or a user device, in order to gain access to protected information is a fundamental aspect to accessing many components of our daily lives. In certain instances, authentication regimes use a single device identifier, like a mobile operating system API, as a means for authenticating a user. However, such device identifiers may be cloned or simulated by entities attempting to gain improper access.

In order to increase security, using multiple device identifiers allows a more robust authentication protocol, making unauthorized access more difficult; however, there is a cost associated with doing so. Increasing unique identifiers associated with a device may increase the amount of false negative authentications of an authorized device in instances where a parameter used to authenticate a device (e.g. OS) changes. An authentication system that allows for differences in unique identifiers, across separate logins, may create a robust system able to use multiple device identifiers, in order to stop improper access using cloned devices, while accounting for changes in device IDs that occur throughout the lifetime of a device. A device authentication system 199, described below, performs a method for collecting multiple unique identifiers from a device, and determining whether the device is authorized to gain access to secure information based on the amount of similarities between the unique identifiers from the device, and the unique identifiers for a listing of authorized devices contained in a database on the device authentication system 199.

Figure 1:
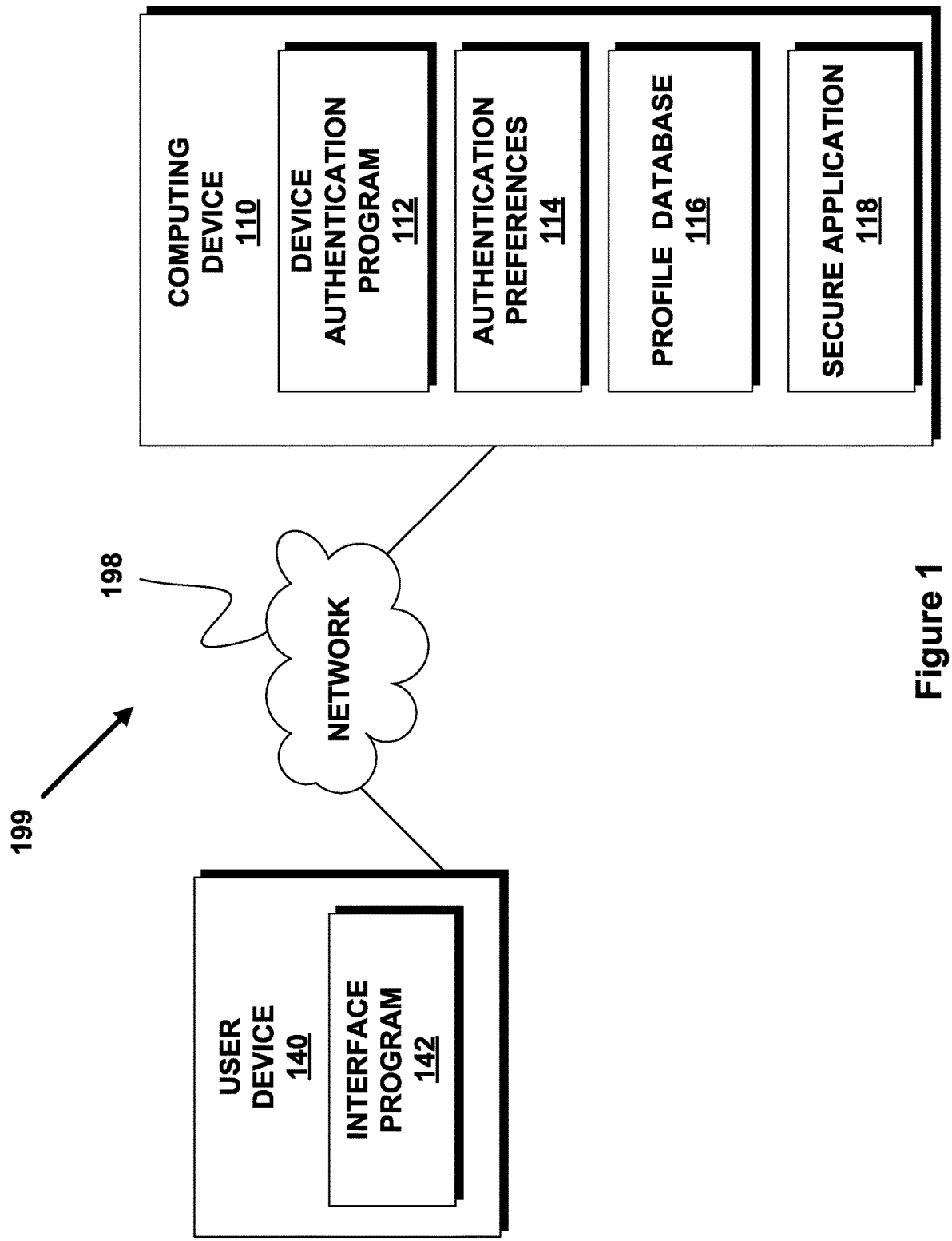
FIG. 1 illustrates a device authentication system, in accordance with an embodiment of the invention.

FIG. 1 illustrates device authentication system 199, in accordance with an embodiment of the invention. In an example embodiment, device authentication system 199 includes a computing device 110 and a user device 140 interconnected via a network 198.

In the example embodiment, network 198 is the Internet, representing a worldwide collection of networks and gateways to support communications between devices connected to the Internet. Network 198 may include, for example, wired, wireless or fiber optic connections. In other embodiments, network 198 may be implemented as an intranet, a local area network (LAN), or a wide area network (WAN). In general, network 198 can be any combination of connections and protocols that will support communications between the computing device 110 and the user device 140.

User device 140 may include an interface program 142. User device 140 may be a desktop computer, a notebook, a laptop computer, a tablet computer, a handheld device, a smart-phone, a thin client, or any other electronic device or computing system capable of receiving and sending data to and from other computing devices such as computing device 110 via network 198. User device 140 is described in more detail with reference to FIG. 3.

Interface program 142 is a program situated on user device 140 that communicates with device authentication program 112. Interface program 142 transmits specific characteristics of the user device 140, referred to as device characteristics, during authentication of the user device 140. Such device characteristics may either be static or dynamic. Static characteristics are characteristics that are unlikely to change between attempts to authentic a device, such as device ID based on the operating system, IMEI number, battery serial number, or any other hardware component identification numbers. Dynamic characteristics are characteristics that frequently change, such as MAC address, and geographic information (e.g. GPS location, cell tower connection). Such characteristics may be gathered by interface program 142 each time an authentication occurs, or alternatively may be collected periodically and retained in disc storage until interface program 142 needs to transmit the characteristics.

Computing device 110 includes device authentication program 112, authentication preferences 114, profile database 116 and secure application 118. In the example embodiment, computing device 110 may be a desktop computer, a notebook, a laptop computer, a tablet computer, a handheld device, a smart-phone, a thin client, or any other electronic device or computing system capable of receiving and sending data to and from other computing devices such as user device 140 via network 198, as well as hosting secure application 118. Although not shown, optionally, computing device 110 can comprise a cluster of web servers executing the same software to collectively process the requests for the web pages as distributed by a front end server and a load balancer. Computing device 110 is described in more detail with reference to FIG. 3.

In the example embodiment, authentication preferences 114 may contain information that details authentication standards. For example, authentication preferences 114 may contain weights corresponding to characteristics of user device 140. Additionally, authentication preferences 114 may contain a threshold value, or criterion for typical (i.e. non-anomalous) behavior, that must be met for authentication to occur. In an example embodiment, authentication preferences 114 may be input by a system administrator.

Profile database 116 is a database storing device characteristics for the user device 140 of a user that is authorized to access secure application 118. The device characteristics stored may relate to device characteristics obtained from interface program 142, and relating to a device authorized to access secure application 118. Each user may have multiple sets of device characteristics associated with them, and located in the profile database 116. Each set of device characteristics, referred to as profile characteristics, may be associated with a single device (e.g. smart phone, tablet) possessed by the user. The profile characteristics may include static and dynamic characteristics associated with the device.

Secure application 118 is a software application or information located on computing device 110 that has restricted access, pending device authentication. Secure application 118 may be a database, web content, program modules, or any type of information run on secure device 110 capable of remote access by a user of user device 140.

Figure 2:
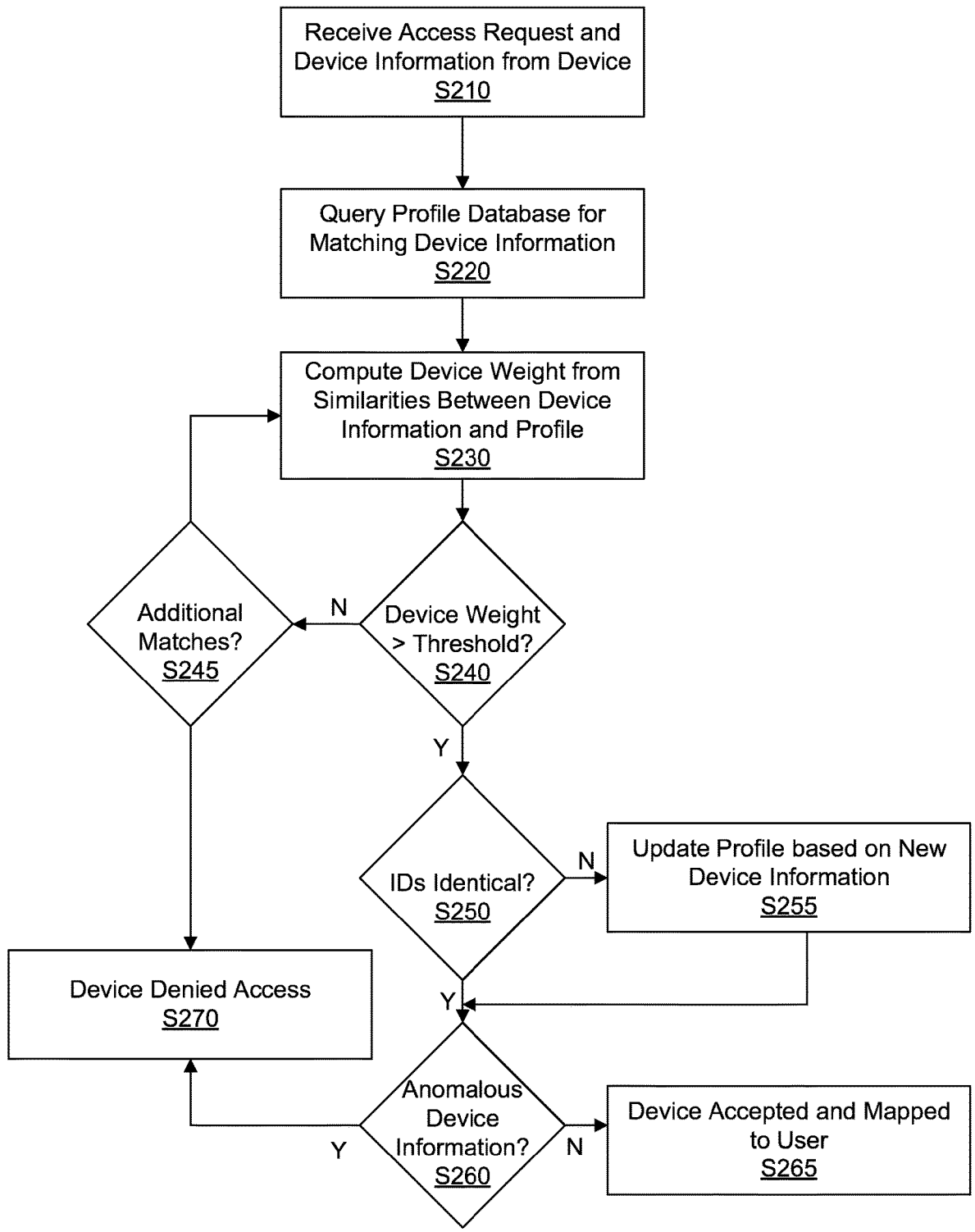
FIG. 2 is a flowchart illustrating the operations of the device authentication program of FIG. 1, in accordance with an embodiment of the invention.

Device authentication program 112 is a software application or configuration in a software application capable of authenticating a user device 140, based on characteristics received from the user device 140. The device authentication program 112 may compare the device characteristics received from user device 140, to sets of device characteristics stored in profile database 116. The device authentication program 112 may authenticate the user device 140 based on the how closely the device profile matches the profile characteristics contained in the profile database 116. In an embodiment, an algorithm contained in device authentication program 112 may determine a match value between the device profile and the profile characteristics by combining weighted values, from authentication preferences 114, associated with each device characteristic from the user device 140 that matches a profile characteristic from profile database 116. In the embodiment, in instances where the match value is above a threshold value, from authentication preferences 114, the user device 140 is authenticated and the user device 140 is granted access to secure application 118. In an additional embodiment, prior to authentication, device authentication program 112 determines that a discrepancy between dynamic characteristics of the device profile and the profile characteristics is anomalous, and rejects the authentication of the user device 140. In such embodiments, anomalous discrepancies in a dynamic characteristic (e.g. an extreme change in physical location) may be, for example, any change in that is physically impossible, or highly unlikely, and would signal an attempt at unauthorized authentication. The operations and functions of device authentication program 112 are described in further detail below with regard to FIG. 2.

Referring to step S210, device authentication program 112 receives an access request and a device profile from user device 140. The access request is a request to be authenticated in order to access information, files, or capabilities located in secure application 118. In an embodiment, the access request may be an establishment of a connection to the computing device 110. In an embodiment, the access request may contain the device profile. The device profile contains all of the static and dynamic characteristics of user device 140. In an additional embodiment, after receiving the access request, the computing device 110 may request the device profile from the user device 140. In both embodiments, the device profile may be encrypted or encoded by the user device 140, and subsequently decoded by computing device 110.

Referring to step S220, device authentication program 112 queries profile database 116 for device information that matches a portion the device information received in step S210. The query may be performed by finding any device entry in the database that matches any portion of the device profile. Additionally, in instances where the user device 140 is attempting to log-in using a username and password, or any other authentication mechanisms, the query may retrieve an entry (or multiple entries) in the database corresponding to the specific username. The characteristics contained in the device entry, referred to as profile characteristics, contains multiple device characteristics for a device associated with an authorized user.

Referring to step S230, device authentication program 112 computes a device weight based on similarities between the device profile received in step S210, and profile characteristics received from the query performed in step S220. In creating the device weight, device authentication program 112 compares corresponding components of the device profile received in step S210 with the profile characteristics retrieved in step S220. Generally, if the elements match the device weight is high. The device weight increases for more matches between device profile elements and device charactersitics. In an example embodiment, when the elements match, the device weight is increased based on the characteristic weight, located in authentication preferences 114. The characteristic weight is a weighted value corresponding to a specific device characteristic. In this embodiment, the higher the characteristic weight, the more likely that device characteristic would signal the specific device that belongs to the authorized user. For example, device weight (DW) may be represented by the equation $DW = W1\ E1 + W2\ E2 + \ldots\ WN\ EN$ where W is the characteristic weight, and E is a binary representation of whether the corresponding element of the device profile and device characteristic match (1) or do not match (0).

Referring to step S240, device authentication program 112 determines if the device weight is greater than a predetermined threshold value. The threshold value may be obtained from the authentication preferences 114, and may be set based on the level of security required for the application. If the device weight is greater than the threshold value, device authentication program proceeds to step S250. If the device weight is less than the threshold value, device authentication program proceeds to step S245.

Referring to step S245, device authentication program 112 determines if there are any additional matches from the query of the profile database 116 that have not had a device weight computed. If there are additional matches, device authentication program proceeds to step S230 to compute the device weight. If there are no additional matches, device authentication program proceeds to step S270.

Referring to step S250, device authentication program 112 determines whether all of the static IDs are contained in the profile characteristics in profile database 116. If there is any discrepancy between the device characteristics and the profile characteristics, or alternatively if there are additional static IDs contained in the device characteristics, the profile characteristics are not up-to-date. In instances where the profile characteristics are not up-to-date, device authentication program proceeds to step S255. In instances where the profile characteristics are up-to-date, device authentication program proceeds to step S260.

Referring to step S255, device authentication program 112 updates the device profile in the profile database 116. In an embodiment, device authentication program 112 may replace a device identifier in the profile database 116 with a changed device identifier received from the user device 140. In another embodiment, device authentication program 112 may include a new device identifier in the entry for the device in profile database 116.

Referring to step S260, device authentication program 112 determines if there is anomalous device information. Anomalous device information may be any information that, if true, would be physically impossible, or highly improbable. In embodiments where the anomalous device information is detected based on a change that is highly improbable, device authentication program 112 may determine that a change in a device characteristic exceeds an anomalous threshold, contained in profile database 116. In an example embodiment, the anomalous device information may be determined when a change in location between login attempts, or across multiple login attempts over a given time period, is above an anomalous threshold value. For example, this may occur when device authentication program 112 were to receive login requests from the "same" device 1 hour apart; the first login request occurring in Bangalore, India; and the second login request occurring in New York City, U.S.A. As it would be highly improbable (if not impossible) to travel from Bangalore to New York City in 1 hour, the request would be denied. If there is anomalous device information, device authentication program 112 proceeds to step S270 to deny the access request. If device authentication program 112 does not find anomalous device information, device authentication program 112 proceeds to step S265.

Referring to step S265, device authentication program 112 grants the request by the device to access the secure application 118 and maps the user device 140 to the authorized user. User device 140 is then granted access to secure application 118.

Referring to step S270, device authentication program 112 denies access to the secure application 118 to the user device 140. Additionally, administrators, or the user whose credentials were being imitated, may be notified of failed login request.

The following example instance is provided to illustrate the operation of the device authentication program 112, and should not be construed as limiting the method performed. In an example instance, a user may attempt to access secure application 118 from user device 140 (S210), and in this attempt to access the user device 140 sends an access request, as well as an IMEI number, a Device ID, a processor serial number, and a battery serial number of the user device 140 to device authentication program 112. Device authentication program 112 queries the profile database 116 (S220) for any entry that contains a matching IMEI number, device ID, processor serial number, or battery serial number, and device authentication program 112, and in the example instance an entry is found having an IMEI number, a device ID and a battery serial number. Device authentication program 112 computes the device weight based on weights obtained from authentication preferences 114. In the example instance, the IMEI number and device number from the profile characteristics match the IMEI number and device number from the device profile (i.e. E1=1, E2=1) but the battery serial numbers do not match (i.e. E3=0). Further, the weight assigned to the IMEI number (i.e. W1) is 0.6; the weight assigned to the device number (i.e. W2) is 0.3; and the weight assigned to the battery serial number (i.e. W3) is 0.1. Therefore, the device weight DW=W1 E1+W2 E2+W3 E3=(0.6)(1)+(0.3)(1)+(0.1)(0)=0.9. In the example instance, the threshold weight from the authentication preferences 114 is 0.7, and thus when the device weight is compared to the threshold weight (S240), device authentication program 112 proceeds to step S250 because the device weight is above the threshold value. In the example instance, device authentication program 112 determines that the profile characteristics are not identical to the device profile (S250), because there is a new element (i.e. processor ID) and a changed element (i.e. battery serial number). In the example instance, device authentication program 112 updates the entry in profile database 116 to contain the new element and update the changed element. Finally, as no anomalous information was detected, device authentication program 112 maps the device to the user, and allows the device to access secure application 118.

Figure 3:
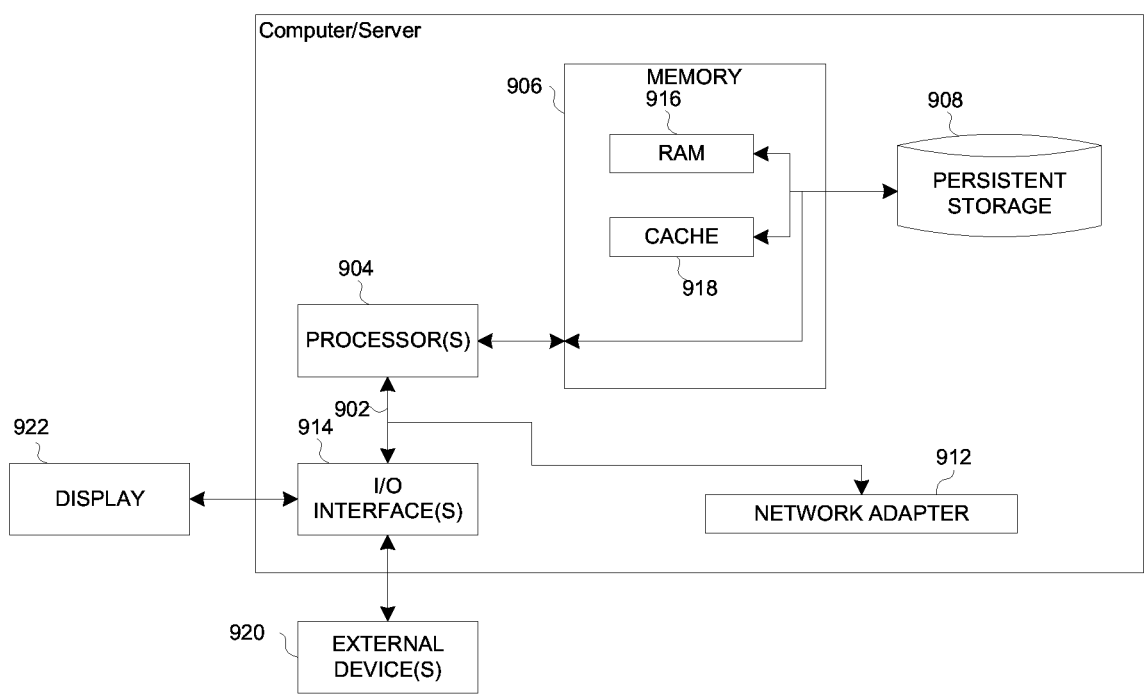
FIG. 3 is a block diagram depicting the hardware components of the device authentication system of FIG. 1, in accordance with an embodiment of the invention.

FIG. 3 depicts a block diagram of components of computing device 110 and user device 140, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 and user device 140 include communications fabric 902, which provides communications between computer processor(s) 904, memory 906, persistent storage 908, communications unit 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

The programs device authentication program 112, authentication preferences 114, profile database 116, and secure application 118 in computing device 110; and interface program 142 in user device 140 are stored in persistent storage 908 for execution by one or more of the respective computer processors 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Communications unit 912, in these examples, provides for communications with other data processing systems or devices. In these examples, communications unit 912 includes one or more network interface cards. Communications unit 912 may provide communications through the use of either or both physical and wireless communications links. The programs device authentication program 112, authentication preferences 114, profile database 116, and secure application 118 in computing device 110; and interface program 142 in user device 140 may be downloaded to persistent storage 908 through communications unit 912.

I/O interface(s) 914 allows for input and output of data with other devices that may be connected to computing device 110 and user device 140. For example, I/O interface 914 may provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention, e.g., the programs device authentication program 112, authentication preferences 114, profile database 116, and secure application 118 in computing device 110; and interface program 142 in user device 140, can be stored on such portable computer-readable storage media and can be loaded onto persistent storage 908 via I/O interface(s) 914. I/O interface(s) 914 can also connect to a display 922.

Display 922 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A method for authenticating a device, the method comprising:
    receiving a plurality of device parameters from a user device, wherein the plurality of device parameters comprise a device ID based on an operating system of the device, an IMEI number, a battery serial number, and a hardware identification number;
    selecting a user profile having a plurality of user profile characteristics from a device database based on determining a match between at least one device characteristic of the plurality of device characteristics with at least one user profile characteristic of the plurality of user profile characteristics;
    determining a device value based on a summation of $W_N * E_N$, wherein $W_N$ is the weight associated with the Nth device parameter, and wherein $E_N$ is a binary representation based on the match between Nth device parameter from the user device with the Nth user profile characteristic, and wherein at least one device parameter does not match the associated user profile characteristic;
    determining whether a difference in values for the at least one device parameter that does not match the associated user profile characteristic is possible;
    based on determining that the device value is above a threshold value and based on determining that the difference in values is possible, authenticating the user device; and
    based on authenticating the user device, updating the user profile having the plurality of user profile characteristics from the device database with the at least one device parameter that does not match the associated user profile characteristic.

2. The method of claim 1, wherein increasing the device value comprises:
    assigning a weight to each of the plurality of device characteristics; and
    based on determining that the device parameter from the plurality of device characteristics matches the user profile parameter of the plurality of user profile characteristics, increasing the device value based on the weight assigned to the device parameter.

3. The method of claim 1 further comprising receiving at least one device characteristic from the group consisting of: a geographic location, a MAC address, and a cell tower location.

4. The method of claim 3 further comprising:
    determining whether a difference in values for the device characteristic and the associated user profile characteristic is possible; and
    based on determining that the device value is above a threshold value and based on determining that the difference in values is possible, authenticating the user device.

5. A computer program product for authenticating a device, the computer program product comprising:
    one or more computer-readable storage devices and program instructions stored on at least one of the one or more tangible storage devices, the program instructions comprising:
        program instructions to receive a plurality of device parameters from a user device, wherein the plurality of device parameters comprise a device ID based on an operating system of the device, an IMEI number, a battery serial number, and a hardware identification number;
        program instructions to select a user profile having a plurality of user profile characteristics from a device database based on determining a match between at least one device characteristic of the plurality of device characteristics with at least one user profile characteristic of the plurality of user profile characteristics;
        determining a device value based on a summation of $W_N * E_N$, wherein $W_N$ is the weight associated with the Nth device parameter, and wherein $E_N$ is a binary representation based on the match between Nth device parameter from the user device with the Nth user profile characteristic, and wherein at least one device parameter does not match the associated user profile characteristic;
        program instructions to determine whether a difference in values for the at least one device parameter that does not match the associated user profile characteristic is possible;
        based on determining that the device value is above a threshold value and based on determining that the difference in values is possible, program instructions to authenticate the user device; and based on authenticating the user device, program instructions to update the user profile having the plurality of user profile characteristics from the device database with the at least one device parameter that does not match the associated user profile characteristic.

6. The computer program product of claim 5, wherein increasing the device value comprises:

program instructions to assign a weight to each of the plurality of device characteristics; and based on determining that the device parameter from the plurality of device characteristics matches the user profile parameter of the plurality of user profile characteristics, program instructions to increase the device value based on the weight assigned to the device parameter.

7. The computer program product of claim 5 further comprising receiving at least one device characteristic from the group consisting of: a geographic location, a MAC address, and a cell tower location.

8. The computer program product of claim 7 further comprising:

determining whether a difference in values for the device characteristic and the associated user profile characteristic is possible; and based on determining that the device value is above a threshold value and based on determining that the difference in values is possible, authenticating the user device.

9. A computer system for authenticating a device, the computer system comprising:

one or more processors, one or more computer-readable memories, one or more computer-readable tangible storage devices, and program instructions stored on at least one of the one or more storage devices for execution by at least one of the one or more processors via at least one of the one or more memories, the program instructions comprising:

program instructions to receive a plurality of device parameters from a user device, wherein the plurality of device parameters comprise a device ID based on an operating system of the device, an IMEI number, a battery serial number, and a hardware identification number;

program instructions to select a user profile having a plurality of user profile characteristics from a device database based on determining a match between at least one device characteristic of the plurality of device characteristics with at least one user profile characteristic of the plurality of user profile characteristics;

determining a device value based on a summation of $W_N * E_N$, wherein $W_N$ is the weight associated with the Nth device parameter, and wherein $E_N$ is a binary representation based on the match between Nth device parameter from the user device with the Nth user profile characteristic, and wherein at least one device parameter does not match the associated user profile characteristic; program instructions to determine whether a difference in values for the at least one device parameter that does not match the associated user profile characteristic is possible;

based on determining that the device value is above a threshold value and based on determining that the difference in values is possible, program instructions to authenticate the user device; and based on authenticating the user device, program instructions to update the user profile having the plurality of user profile characteristics from the device database with the at least one device parameter that does not match the associated user profile characteristic.

10. The computer system of claim 9, wherein increasing the device value comprises:

program instructions to assign a weight to each of the plurality of device characteristics; and based on determining that the device parameter from the plurality of device characteristics matches the user profile parameter of the plurality of user profile characteristics, program instructions to increase the device value based on the weight assigned to the device parameter.

* * * * *